United States Patent
Niu et al.

(10) Patent No.: US 12,445,392 B2
(45) Date of Patent: Oct. 14, 2025

(54) STREAMING COMMUNICATION BETWEEN DEVICES

(71) Applicant: Microsoft Technology Licensing, LLC, Redmond, WA (US)

(72) Inventors: Zhixiong Niu, Redmond, WA (US); Ran Shu, Redmond, WA (US); Lei Qu, Redmond, WA (US); Peng Chen, Redmond, WA (US); Yongqiang Xiong, Beijing (CN); Guo Chen, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 704 days.

(21) Appl. No.: 17/606,715

(22) PCT Filed: Apr. 2, 2020

(86) PCT No.: PCT/US2020/026467
§ 371 (c)(1),
(2) Date: Oct. 26, 2021

(87) PCT Pub. No.: WO2020/242598
PCT Pub. Date: Dec. 3, 2020

(65) Prior Publication Data
US 2022/0217098 A1  Jul. 7, 2022

(30) Foreign Application Priority Data
May 31, 2019 (CN) .......................... 201910472421.7

(51) Int. Cl.
*H04L 67/1097* (2022.01)
*H04L 49/102* (2022.01)
(Continued)

(52) U.S. Cl.
CPC ........ *H04L 49/102* (2013.01); *H04L 49/9005* (2013.01); *H04L 49/9036* (2013.01); *H04L 67/1097* (2013.01)

(58) Field of Classification Search
CPC ............... H04L 49/102; H04L 49/9005; H04L 49/9036; H04L 67/1097; H04L 49/901; H04L 49/9031; H04W 28/021
See application file for complete search history.

(56) References Cited

U.S. PATENT DOCUMENTS

| 7,554,976 B2 | 6/2009 | Feng et al. |
| 7,664,833 B2 | 2/2010 | Shoolman et al. |

(Continued)

FOREIGN PATENT DOCUMENTS

| CN | 1368681 A | 9/2002 |
| CN | 1540523 A | 10/2004 |

(Continued)

OTHER PUBLICATIONS

Office Action Received for Chinese Application No. 201910472421.7, mailed on Jan. 27, 2024, 11 pages (English Translation Provided).

(Continued)

*Primary Examiner* — Peter P Chau
(74) *Attorney, Agent, or Firm* — Schwegman Lundberg & Woessner, P.A.

(57) ABSTRACT

In accordance with implementations of the subject matter described herein, there is provided a solution for streaming communication between devices. In this solution, a memory of a first device comprising a ring buffer is allocated to be dedicated for storing a data stream of an application to be transmitted to a second electronic device. The application of the first device writes data to be transmitted into the ring buffer, to form a portion of the first data stream, and a write pointer of the ring buffer is thus updated. A portion of data (Continued)

is read based on a source memory address from the ring buffer via the interface device. The interface device also transmits the data portion to a second device. The read data portion is stored in a dedicated ring buffer of the memory. In accordance with the solution, an efficient streaming communication interface is provided between devices.

20 Claims, 5 Drawing Sheets

(51) Int. Cl.
　　*H04L 49/90*　　　　(2022.01)
　　*H04L 49/9005*　　　(2022.01)

(56) References Cited

U.S. PATENT DOCUMENTS

| | | | |
|---|---|---|---|
| 8,495,257 | B2 | 7/2013 | Desai et al. |
| 9,792,248 | B2 | 10/2017 | Shamis et al. |
| 10,198,397 | B2 | 2/2019 | Fu |
| 11,025,564 | B2 | 6/2021 | Humphrey et al. |
| 2007/0162639 | A1* | 7/2007 | Chu ............. G06F 13/128 710/22 |
| 2008/0043732 | A1* | 2/2008 | Desai ........... H04L 67/1097 370/389 |
| 2009/0083392 | A1* | 3/2009 | Wong ............. G06F 13/28 709/212 |
| 2014/0258438 | A1* | 9/2014 | Ayoub ........... G06F 13/28 709/212 |
| 2017/0075816 | A1* | 3/2017 | Okada ............ G06F 21/79 |
| 2018/0295052 | A1* | 10/2018 | St-Laurent ....... H04L 69/329 |
| 2019/0034381 | A1 | 1/2019 | Burstein et al. |
| 2022/0217098 | A1 | 7/2022 | Niu et al. |

FOREIGN PATENT DOCUMENTS

| | | |
|---|---|---|
| CN | 101199011 A | 6/2008 |
| CN | 103163827 A | 6/2013 |
| CN | 107257354 A | 10/2017 |

OTHER PUBLICATIONS

Third Office Action Received for Chinese Application No. 201910472421.7, mailed on May 14, 2024, 23 pages. (English Translation Provided).

"Apache Storm", Retrieved from: https://web.archive.org/web/20181229081009/http:/storm.apache.org/, Dec. 29, 2018, 4 Pages.

"DPDK: Data Plane Development Kit", Retrieved from: https://web.archive.org/web/20190103072605/https:/www.dpdk.org/, Jan. 3, 2019, 4 Pages.

"Mellanox Adapters Programmer's Reference Manual (PRM)", Retrieved from: https://web.archive.org/web/20170129063105/http:/www.mellanox.com/related-docs/user_manualsEthernet_Adapters_Programming_Manual.pdf, Jan. 29, 2017, 415 Pages.

"MPI Forum", Retrieved from: https://web.archive.org/web/20181216032042/https:/www.mpi-forum.org/, Dec. 16, 2018, 2 Pages.

"Network Direct SPI", Retrieved from: https://docs.microsoft.com/en-us/previous-versions/windows/desktop/cc904397 (v=vs.85), Jul. 2, 2010, 2 Pages.

"RDMA-iWarp", Retrieved from: https://web.archive.org/web/20190405165726/http:/www.chelsio.com/nic/rdma-iwarp/, Apr. 5, 2019, 4 Pages.

"Seastar", Retrieved from: https://web.archive.org/web/20190216041409/http://seastar.io/, Apr. 5, 2019, 4 Pages.

"SQL Server 2016", Retrieved from: https://web.archive.org/web/20161018101330/https:/www.microsoft.com/en-us/sql-server/sql-server-2016, Oct. 18, 2016, 12 Pages.

"Streaming DMA Accelerator Functional Unit User Guide", Retrieved from: https://www.intel.com/content/www/us/en/programmable/documentation/ctb1526061110715.html, Mar. 6, 2020, 30 Pages.

"TCP Chimney Offload", Retrieved from: https://docs.microsoft.com/en-us/previous-versions/windows/hardware/network/ndis-tcp-chimney-offload, Apr. 20, 2017, 2 Pages.

Atikoglu, et al., "Workload Analysis of a Large-Scale Key-Value Store", In Proceedings of the 12th ACM Sigmetrics/Performance Joint International Conference on Measurement and Modeling of Computer Systems, Jun. 11, 2012, pp. 53-64.

Balaji, et al., "Sockets Direct Protocol over InfiniBand in Clusters: Is it beneficial?", In Proceedings of the IEEE International Symposium on—ISPASS Performance Analysis of Systems and Software, Mar. 10, 2004, pp. 28-35.

Belay, et al., "IX: A Protected Dataplane Operating System for High Throughput and Low Latency", In Proceedings of the 11th USENIX Symposium on Operating Systems Design and Implementation, Oct. 6, 2014, pp. 49-65.

Caulfield, et al., "A Cloud-Scale Acceleration Architecture", In Proceedings of the 49th Annual IEEE/ACM International Symposium on Microarchitecture, Oct. 15, 2016, 13 Pages.

Caulfield, et al., "Beyond SmartNICs: Towards a Fully Programmable Cloud", In Proceedings of the IEEE International Conference on High Performance Switching and Routing, Jun. 2018, 6 Pages.

Dragojević, et al., "FaRM: Fast Remote Memory", In Proceedings of 11th USENIX Symposium on Networked Systems Design and Implementation, Apr. 2, 2014, pp. 401-414.

Goldenberg, et al., "Zero Copy Sockets Direct Protocol over InfiniBand—Preliminary Implementation and Performance Analysis", In Proceedings of 13th Symposium on High Performance Interconnects, Aug. 17, 2005, 10 Pages.

Guo, et al., "ROMA over Commodity Ethernet at Scale", In Proceedings of the ACM SIGCOMM Conference, Aug. 22, 2016, 14 Pages.

Handley, et al., "Re-architecting Datacenter Networks and Stacks for Low Latency and High Performance", In Proceedings of the Conference of the ACM Special Interest Group on Data Communication, Aug. 21, 2017, pp. 29-42.

Jeong, et al., "mTCP: A Highly Scalable User-level TCP Stack for Multicore Systems", In Proceedings of 11th USENIX Symposium on Networked Systems Design and Implementation, Apr. 2, 2014, pp. 489-502.

Kalia, et al., "Design Guidelines for High Performance RDMA Systems", In Proceedings of USENIX Annual Technical Conference, Jun. 22, 2016, pp. 437-450.

Kalia, et al., "FaSST: Fast, Scalable and Simple Distributed Transactions with Two-Sided (ROMA) Datagram RPCs", In Proceedings of 12th USENIX Symposium on Operating Systems Design and Implementation, Nov. 2, 2016, pp. 185-202.

Kaufmann, et al., "Lightweight Data Center TCP Packet Processing", In Journal of Under Submission, Feb. 26, 2019, 20 Pages.

Li, et al., "A Hardware Supported Method of RDMA Transmission for Unreliable Networks", In Proceedings of the 3rd IEEE International Conference on Computer and Communications, Dec. 13, 2017, pp. 2648-2653.

MacArthur, "An Efficient Method for Stream Semantics over RDMA", In Proceedings of IEEE 28th International Parallel and Distributed, May 19, 2014, pp. 841-851.

MacArthur, et al., "Implementing TCP Sockets over ROMA", In 2nd Annual InfiniBand User Group Workshop, Apr. 3, 2014, 31 Pages.

Marrinos, et al., "Network Stack Specialization for Performance", In Proceedings of ACM SIGCOMM Computer Communication Review, vol. 44, Aug. 17, 2014, pp. 175-186.

Mittal, et al., "Timely: RTT-based Congestion Control for the Datacenter", In Proceedings of ACM Conference on Special Interest Group on Data Communication, Aug. 17, 2015, pp. 537-550.

Nangare, Sagar, "NVMe over Fabrics: Fibre Channel vs. RDMA", Retrieved from: https://www.networkcomputing.com/data-centers/nvme-over-fabrics-fibre-channel-vs-rdma, Aug. 15, 2018, 6 Pages.

Nishtala, et al., "Scaling Memcache at Facebook", In Proceedings of the 10th USENIX conference on Networked Systems Design and Implementation, vol. 13, Apr. 2, 2013, pp. 385-398.

"International Search Report and Written Opinion Issued in PCT Application No. PCT/US20/026467", Mailed Date: Jun. 12, 2020, 12 Pages.

(56) References Cited

OTHER PUBLICATIONS

Recio, et al., "A Remote Direct Memory Access Protocol Specification", Retrieved from: https://tools.ietf.org/pdf/rfc5040.pdf, Oct. 2007, 66 Pages.

Rizzo, Luigi, "Netmap: A Novel Framework for Fast Packet I/O", In Proceedings of the USENIX conference on Annual Technical Conference, Jun. 13, 2012, 12 Pages.

Satran, et al., "Internet Small Computer Systems Interface (iSCSI)", Retrieved from: https://datatracker.ietf.org/doc/html/rfc3720, Apr. 2004, 257 Pages.

Shieh, et al., "Trickles: A Stateless Network Stack for Improved Scalability, Resilience, and Flexibility", In Proceedings of the 2nd conference on Symposium on Networked Systems Design & Implementation—vol. 2, May 2, 2005, pp. 175-188.

Willhalm, et al., "Intel® Performance Counter Monitor—A Better Way to Measure CPU Utilization", Retrieved from: https://software.intel.com/en-us/articles/intel-performance-counter-monitor, Aug. 16, 2012, 14 Pages.

Zhu, et al., "Congestion control for large-scale RDMA Deployments", In Proceedings of the ACM Conference on Special Interest Group on Data Communication, vol. 45, Aug. 17, 2015, pp. 523-536.

"First Office Action and Search Report Issued in Chinese Patent Application No. 201910472421.7", Mailed Date: Jul. 3, 2023, 18 Pages.

"Notice of Allowance Issued in European Patent Application No. 20722105.2", Mailed Date: Oct. 20, 2023, 8 Pages.

Office Action Received for Chinese Application No. 201910472421.7, mailed on Aug. 2, 2024, 16 pages. (English Translation Provided).

"Decision to grant a European patent pursuant to Article 97(1) received in European Application No. 20722105.2", mailed on Mar. 28, 2024, 2 pages.

\* cited by examiner

STREAMING COMMUNICATION BETWEEN DEVICES

CROSS-REFERENCE TO RELATED APPLICATION

This application is a U.S. National Stage Filing under 35 U.S.C. 371 of International Patent Application Serial No. PCT/US2020/026467, filed Apr. 2, 2020, and published as WO 2020/242598 A1 on Dec. 3, 2020, which claims priority to Chinese Application No. 201910472421.7, filed May 31, 2019, which applications and publication are incorporated herein by reference in their entirety.

BACKGROUND

Network transmission with high throughput and low latency is needed in modern data center applications to satisfy the growth of clients' demands. Compared with conventional transmission layer protocols, for example, transmission control protocol (TCP), some interface devices providing hardware communication interfaces achieve superior performance through hardware acceleration. For example, remote direct memory access (RDMA) implements the entire transmission logic in a network interface card (NIC), in which the network stack is implemented through a hardware interface, and allows a direct access to a remote memory without involvement of a central processing unit (CPU) or an operating system. Therefore, with the RDMA, network transmission with high throughput and pretty low latency the can be achieved almost without involvement of CPU.

The RDMA, however, is not equivalent to the conventional network communication. For example, the network communication supports message-based communication in which two communication parties transmit data using discrete messages (packets) with size pre-known by both, and stream-based communication in which two communication parties transmit data through continuous data streams. The streaming communication provides more convenience, such that it can leave out the necessity of knowing the size of data to be transmitted in advance when a sender needs to send data or a receiver needs to receive data. However, the RDMA only provides message-based data communication. Although streaming communication on the basis of RDMA can be implemented in some solutions, these solutions may lose the performance of the RDMA hardware interface.

SUMMARY

In accordance with implementations of the subject matter described herein, there is provided a solution for streaming communication between devices. In this solution, a memory of a first device comprising a ring buffer is allocated to be dedicated for storing a data stream of an application to be transmitted to a second electronic device. The application of the first device writes data to be transmitted into the ring buffer, to form a portion of the first data stream, and a write pointer of the ring buffer is thus updated. In response to updating the write pointer, a portion of data is read based on a source memory address from the ring buffer via the interface device. The interface device also transmits, based on a destination memory address of the read data portion, the data portion to a second device. The read data portion is stored in a dedicated ring buffer of the memory. In accordance with the solution, an efficient streaming communication interface is provided between devices.

The Summary is to introduce a selection of concepts in a simplified form that are further described below in the Detailed Description. This Summary is not intended to identify key features or essential features of the subject matter described herein, nor is it intended to be used to limit the scope of the subject matter described herein.

BRIEF DESCRIPTION OF THE DRAWINGS

Throughout the drawings, the same or similar reference symbols refer to the same or similar elements.

DETAILED DESCRIPTION OF EMBODIMENTS

The subject matter described herein will now be described with reference to several example implementations. It should be appreciated that description of those implementations is merely for the purpose of enabling those skilled in the art to better understand and further implement the subject matter described herein and is not intended for limiting the scope disclosed herein in any manner.

As used herein, the term "includes" and its variants are to be read as open-ended terms that mean "includes, but is not limited to." The term "based on" is to be read as "based at least in part on." The terms "an implementation" and "one implementation" are to be read as "at least one implementation." The term "another implementation" is to be read as "at least one other implementation." The term "first," "second" or the like may represent different or the same objects. Other definitions, either explicit or implicit, may be included below.

Conventional Device Communication System

Figure 1:
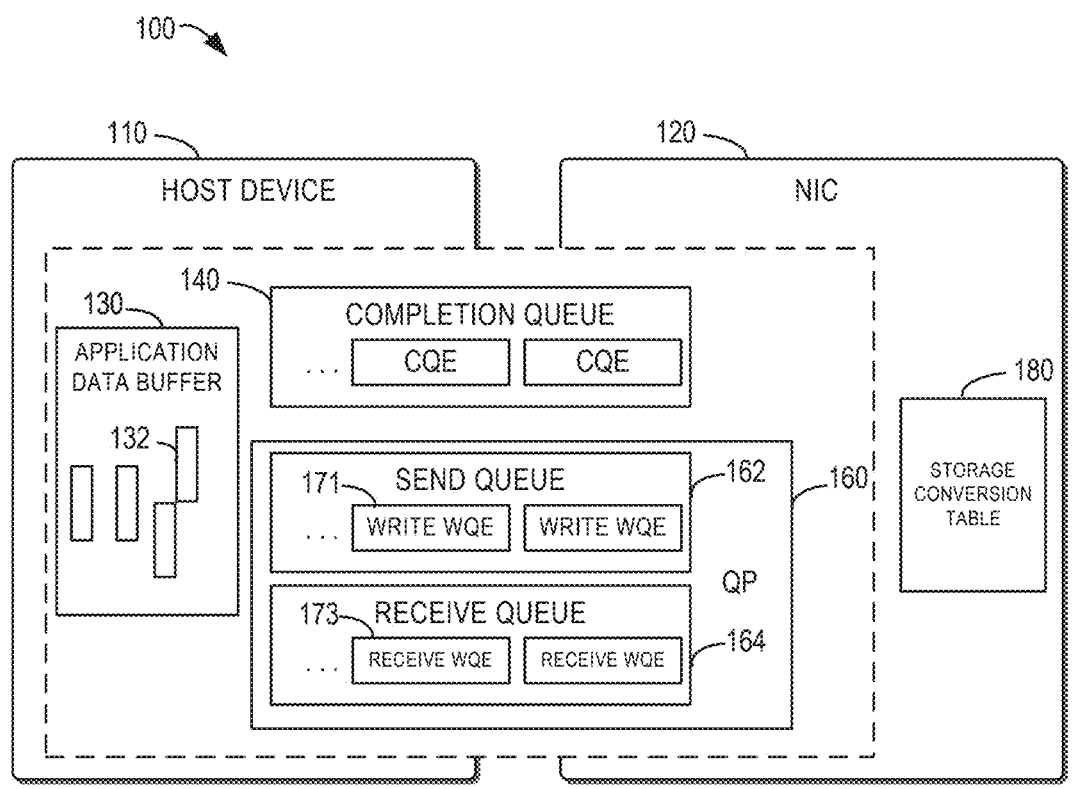
FIG. 1 is a system block diagram illustrating a conventional hardware-based device communication.

As aforementioned, an interface device with hardware communication interfaces may be used to implement hardware acceleration for inter-device communication. A typical example is to provide communication for a host device using a Network Interface Card (NIC), in particular, the Remote Direct Memory Access (RDMA) technique is used to provide a direct access to a remote memory. FIG. 1 is a block diagram illustrating a conventional hardware-based device communication system 100. The system 100 includes a host device 110 and an NIC 120. The NIC 120 may enable the host device 110 to communicate with a further remote device via a network.

The host device 110 is an electronic device with a certain computing and storing capability, for example, a computer or a processor. There is one or more applications run on the host device 110, these applications access a memory of a remote device according to a processing need. The NIC 120 supporting RDMA is also referred to as RMDA NIC 120. The RDMA technique supports message (packet)-based data transmission. In order to implement streaming communication, the host device 110 needs to execute some essential tasks prior to communication of applications, for example, specifying a specific size in each packet and preparing an application data buffer 130 of the host device 110. Data portions 132 for applications are stored in the application data buffer 130, and each data portions 132 is of a specified size.

In order to support a plurality of independent connections, for each connection of the host device with a further remote device, a pair of work queues may be maintained, which is also referred to as a queue pair (QP). As shown in FIG. 1, the queue pair includes a send queue 162 and a receive queue 164. Through an operation type (e.g., SEND (indicating data send), RECV (indicating data receive), WRITE (indicating data write) or READ (indicating data read)) indicated by message primitives of the RDMA technique, the host device 110 may provide, to the work queues 162, 164, respective data buffer information (e.g., a memory address and a data size) as a work queue element (WQE). For example, a write WQE 171 for data write is included in the send queue 162, and a receive WQE 173 for data receive is included in the receive queue 164. The host device 110 initiates a notification to the NIC 120, and upon receiving the notification, the NIC 120 reads the WQE from the work queue 162 or 164 and sends or receives, through a hardware network stack, application data specified in the WQE.

In order to support general memory access, it is required to maintain context information per packet and the context information is stored in a WQE. Specifically, each WQE 171 or 173 maintains some necessary status information for memory access, including an operation type (e.g., READ/WRITE), a memory address, a data length, and the like. In addition, it is also required to store status information (e.g., the number of WQEs, a user page size, and a storage conversion table address) used by memory access involved in each QP, and network status information (e.g., a packet sequence number, an Internet Protocol (IP)/Multimedia Access Control (MAC) address, and the like).

In addition to status information related to the WQE and the QP, the RDMA technique also needs to maintain a large storage conversion table 180 indicating conversions from virtual memory addresses to physical memory addresses. It is typically required to store the storage conversion table 180 in the memory of the NIC 120. The WQE-related status information related to each packet and the QP-related status information related to each connection may be stored in the memory of the host device 110, but also needs to be cached in the NIC 120, to reduce latency and improve throughput. The memory space of the NIC 210 is usually limited and thus can only store a small amount of status information.

A lot of applications in current devices, in particular a network server, a search index server and the like, have to service a great number of connections concurrently. For each connection and each operation (i.e., each message transmission), the NIC needs to cache a lot of context information. With the increase of the numbers of connections and the number of messages, cache miss causes the NIC to extract the information from the memory of the host device through a Peripheral Component Interconnect express (PCIe) bus, resulting in high latency and low performance. Sometimes, it is required to limit the number of connections and the number of concurrent operations supported by the NIC, in order to guarantee the performance. Hence, in this communication scenario, the scalability of the NIC is not sufficient to support a large number of concurrent connections and concurrent operations.

On the other hand, streaming communication has more advantages. For example, two communication parties can transmit data therebetween whenever it is required, without foreknowledge of the size of the data to be transmitted, which is quite advantageous for inter-device streaming communication. However, achieving streaming communication on the basis of supporting packet communication-based RDMA is a widely recognized challenge. Current existing solutions mainly focus on converting a packet into a data stream on a software level, bringing about a lot of issues.

First of all, since a device of a receiver in streaming communication does not have foreknowledge of the size of incoming data, there are typically two ways to warp RDMS operations into a streaming receive. One choice is indirect transmission, i.e., the receiver puts multiple RDMA receive operations into a NIC. If an application is to send data, the device of the receiver first receives the data to an intermediate buffer addressed by these RDMA receive operations, and then interrupts the application and copies all the received data to the application buffer. However, the extra memory copy and application interrupt will incur significant latency. The other choice is direct transmission. In order to avoid memory copy, whenever the application in the receiver device calls a receiving function, it first notifies the device of the sender with the memory address of the application data to be received and the maximum data size. When the device of the sender has data to transmit, it can directly write data to the memory address notified previously. However, in the direct transmission, the device of the sender cannot send subsequent data if the receiver has not finished the current receive call and notified the next receive information (the next memory address and data size). Such stop-and-wait manner would greatly impact network throughput.

Moreover, in order to implement the streaming communication, it is required to split the data to be sent into discrete RDMA packets on the software level, so as to provide a byte-stream abstraction to an application. But it is difficult to decide such splitting size. If the data are split into many small packets, it will bring exceedingly high computing overhead, thereby limiting total throughput. Generation of many small packets will impact the hardware accelerating effect of the RNIC. Further, if data is split into packets of large size, an extra memory replication operation is required to aggregate small data blocks into a bigger packet, causing unnecessary latency.

Basic Work Principle and Example System

In accordance with implementations of the subject matter described herein, there is provided a fast and scalable inter-device streaming communication solution. Specifically, a ring buffer is allocated to be dedicated for a data stream of an application to be transmitted to a second device in a memory of the first device. The data to be transmitted by the application of the first device is written into the ring buffer to form a part of the first data stream, and a write pointer in the ring buffer is updated accordingly. In response to updating the write pointer, a portion of the data is read from the ring buffer via an interface device, based on a source memory address. The interface device transmits, based on a destination memory address of the read data portion, the data portion to the second device, specifically the dedicated ring buffer in the memory of the read data portion.

In accordance with the solution, an efficient streaming communication interface is provided between devices. An application performs data read and write for the ring buffer as required, without specifying the size of the data to be transmitted. Since the interface device is not limited by the status information any more, higher scalability can be provided to support different data streams of different applications or the same application.

Detailed implementations will be given below with reference to the drawings.

Figure 2:
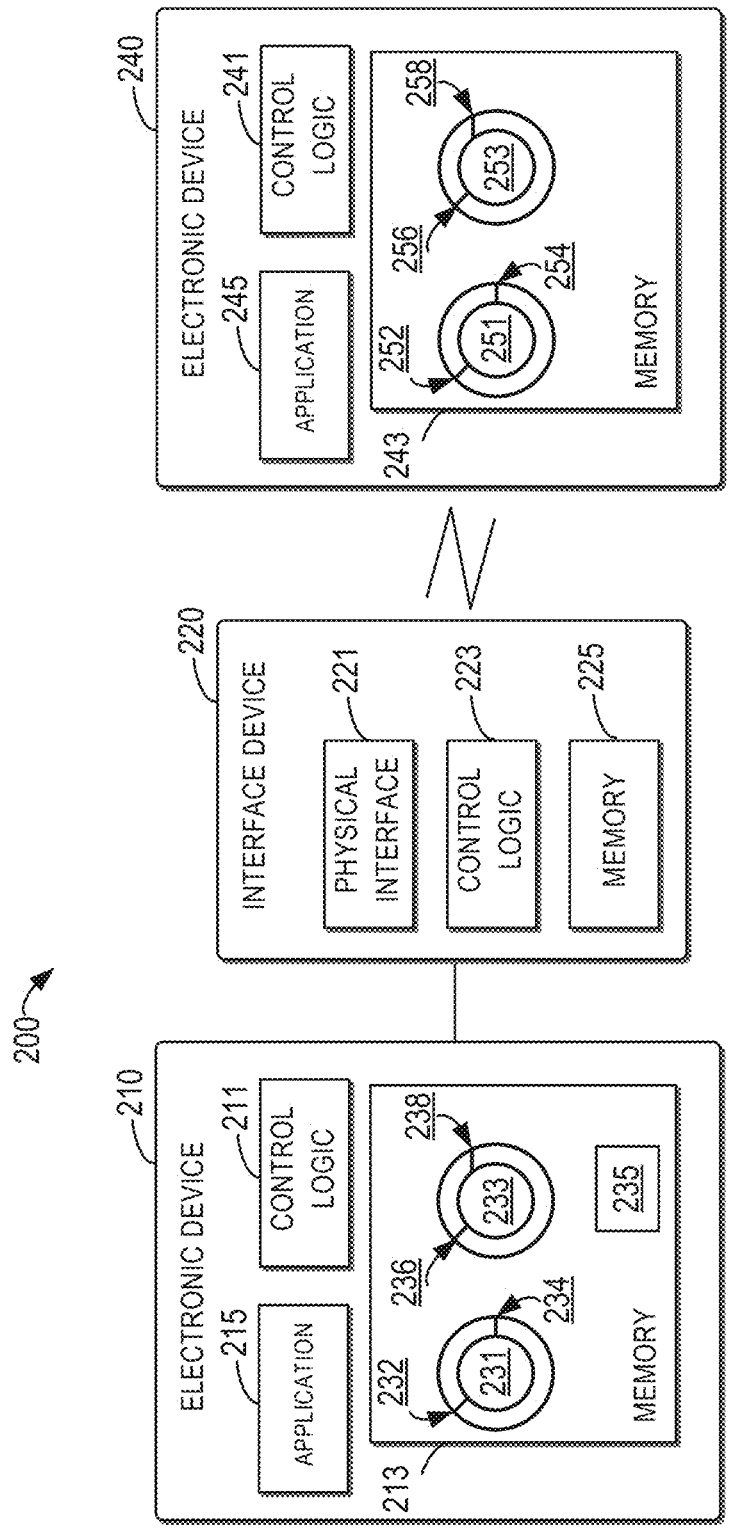
FIG. 2 is a system block diagram illustrating inter-device streaming communication in accordance with some implementations of the subject matter described herein.

FIG. 2 is a block diagram illustrating a system 200 for inter-device streaming communication in accordance with some implementations of the subject matter described herein. The system 200 includes an electronic device 210, an interface device 220 and an electronic device 240. The interface device 220 is configured to provide a connection between the electronic device 210 and other electronic devices, for example, the electronic device 240, for use in transmission of data and/or other information between devices.

The electronic devices 210 and 240 may be any physical device or virtual device, or may be components within a device. In some implementations, either of the electronic devices 210 and 240 may be implemented as a service terminal or a user terminal. The service terminal may be a server, a large-scale computing device, or the like, which is provided by various service providers. The user terminal, for example, is any type of fixed terminal or portable terminal, including a mobile phone, a multimedia computer, a multimedia panel, an Internet node, a desktop computer, a laptop computer, a tablet computer, and the like. In some implementations, either of the electronic devices 210 and 214 may be a processor, for example, a Central Processing Unit (CPU), a Graphics Processing Unit (GPU), a controller, or the like, or may be a storage device, for example, various types of hard disks, magnetic disks, or the like.

The electronic device 210 includes control logic 211, a memory 213 and an application 215. The control logic 211 is configured to control computing and processing operations in the electronic device 210. The control logic 211 may be implemented in any combination of hardware, software and firmware, for example, various processors, controllers, microprocessors, microcontrollers, and the like. The memory 213 may include a plurality of computer storage mediums, including, but is not limited to, volatile and non-volatile mediums, and removable and non-removable mediums. The memory 213 may be a volatile memory (e.g., a register, a cache, a random access memory (RAM), a dynamic RAM (DRAM)), a non-volatile memory (e.g., a read-only memory (ROM), an electrically erasable programmable read-only memory (EEPROM), a flash memory, a hard disk, a solid state Drive (SSD)), or any combination thereof. The application 215 which may also be referred to as an application module is designed in the electronic device 210 for processes, threads, and the like, of various tasks such as computing, processing, analysis, and the like.

Likewise, the electronic device 240 also includes control logic 241, a memory 243 and an application 245. The control logic 241, memory 243 and application 245 are functionally similar to the components in the electronic device 210.

The interface device 220 includes a physical interface 221, control logic 223 and a possible memory 225. The physical interface 221 is operable to connect the interface device 220 with the electronic device 210. The control logic 223 is configured to control computing and processing operations in the interface device 220. The control logic 223 may be implemented in any combination of hardware, software and firmware, for example, various processors, controllers, microprocessors, microcontrollers, and the like. The memory 225 which may be an on-chip memory of the interface device 220, may store data and/or information required by an operation of the interface device 220 and may be fast accessed by the control logic 223. The memory 225 may provide a memory space of any size.

In the example of FIG. 1, the physical interface 221 is used to provide a hardware connection with the electronic device 210. The physical interface 221 may be connected directly to the electronic device 210, or connected indirectly to the electronic device 210 via a further connection line. In some implementations, according to the utilized access technology, for example, DMA technology, the interface device 220 can directly access the memory of the electronic device 210. In addition, the physical interface 221 may implement communication coupling between the electronic device 210 and the electronic device 240. In some implementations, the electronic device 240 may also be connected to the interface device 220 directly or indirectly via the physical interface 221. The electronic device 240 may be coupled to the interface device 220 via another interface device, which will be discussed below. In some implementations, the memory of the electronic device 240 may be accessed directly by the interface device 220 or another interface device.

Depending on the electronic device 210 and probably depending on the type of the electronic device 240, the interface device 220 may be an NIC, a storage routing device, a server attached device, an adapter of a corresponding type, or any other interface device that that can provide a connection between devices. Depending on the type of the interface device 220, the physical interface 221 may be implemented in different manners. In an example, if the interface device 220 is an NIC device coupled to the electronic devices 210 and 240 via a network, the physical interface 221 may include a hardware-implemented network stack module. In an example, if the electronic device 210 or electronic device 240 is a processing device or a storage device, the physical interface 221 may also be implemented as other hardware that can provide a connection for such types of devices. The scope of implementations of the subject matter described herein is not limited in any manner.

In an operation, an application on an electronic device probably expects to access (e.g., read or write) a memory of another electronic device, to write/read data into/from the memory. An interface device connected with the electronic devices is provided for assisting in such memory access. In order to support efficient inter-device streaming communication, in accordance with implementations of the subject matter described herein, the memories 213 and 243 of the electronic devices 210 and 240 are allocated dedicated ring buffers, respectively, for supporting data streams for the application.

Specifically, the memory 213 is allocated a ring buffer 231 (which is sometimes referred to as the "first ring buffer" herein, for the purpose of illustration). The ring buffer 231 is dedicated for storing a data stream (which is sometimes referred to as the "first data stream" for the purpose of illustration) of an application 215 to be transmitted to the electronic device 240. The second data stream may be a data stream desired to be transmitted by the application 215 in the electronic device 210 to the application 245 in the electronic device 240. In other words, the ring buffer 231 is dedicated to the data streams of the application 215.

In some implementations, in order to implement transmission of the application data, a connection is established for the application 215 and the application 245 between the electronic device 210 and the electronic device 240 (which may be implemented, for example, when the interface device 220 is an NIC), and the ring buffer 231 may also be considered to be dedicated to the connection. The application 215 may transmit a plurality of data streams to the electronic device 240 or other electronic devices, or establish a plurality of connections for transmitting data streams. In this case, a plurality of ring buffers similar to the ring buffer 231 may be allocated in the memory 213, each of which is dedicated to a data stream or a connection. Correspondingly, a ring buffer 253 allocated in the memory 243 of the electronic device 240, which is sometimes referred to as the "second ring buffer," for the purpose of illustration, is dedicated for storing the first data stream of the application 215 received from the electronic device 240. The ring buffer 253 may also be considered to be dedicated to a connection between applications.

For the purpose of understanding, a ring buffer is briefly introduced first. The ring buffer is sometimes referred to as circular buffer, a loop queue or a circular queue, which is a section of head-to-tail storage area of a fixed size. For each ring buffer, it is usually required to maintain two pointers, namely a write pointer pointing to a memory address in the ring buffer to which data can be written, and a read pointer pointing to a memory address in the ring buffer from which data can be read. The data access in the ring buffer may follow a first-in first-out principle. The write pointer sometimes may be configured as a tail pointer pointing to the end of the data stored in the ring buffer, while the read pointer sometimes may be configured as a head pointer pointing to the beginning of the data stored in the ring buffer. In another example, the setting of the write pointer and the read pointer may be configured otherwise, i.e., the write pointer is configured as the head pointer, while the read pointer is configured as the tail pointer. The implementations of the subject matter described herein are not limited in this aspect. If the ring buffer is empty, the write and read pointers point to the same memory address.

In the example of FIG. 1, the ring buffer 231 includes a write pointer 232 and a read pointer 234, and the ring buffer 253 includes a write pointer 256 and a read pointer 258. In this disclosure, the ring buffers 231, 253 are used for implementing streaming transmission and thus sometimes referred to as streaming buffer. The ring buffer 231 is used for storing a data stream to be sent from the electronic device 210 and thus may also be referred to as a buffer for data to be sent, and the ring buffer 253 is used for storing a data stream received by the electronic device 240 from the electronic device 210 and thus may be referred to as buffer for received data.

In an operation, whenever the application 215 needs to send a portion of data to the electronic device 240, the control logic 211 may control writing of the data portion into the ring buffer 231. The data placed in the ring buffer 231 forms a portion of the first data stream. If there is a plurality of data streams or connections for the application 215, it may be determined to which data stream or connection the current data portion to be sent belongs, such that the data portion can be written into the corresponding dedicated ring buffer. In this process, there is no need to specify the data size placed by the application 215 into the ring buffer 231 every time in advance. From the angle of the application 215, whenever any data is to be sent, this portion of data may always be written into the ring buffer 231, to achieve the streaming transmission effect.

In the implementations of the subject matter described herein, the write pointer 232 and the read pointer 234 of the ring buffer 231 are maintained in the electronic device 210, specifically in the memory 213. For example, the memory 213 includes a storage area 235 for storing status information for the first data stream. The write pointer 232 and the read pointer 234 may be stored in the storage area 235. The write pointer 232 is updated as data is continuously written into the ring buffer 231, and the read pointer 234 is updated as the data is read from the ring buffer 231.

After the data portion is written into the ring buffer 231, since the stored data increases, the control logic 211 will modify the write pointer 232 of the ring buffer 231 to point to the current data-writable memory address in the ring buffer 231. In response to the write pointer 232 of the ring buffer 231 is modified, the control logic 211 causes the interface device 220 to transmit the data in the ring buffer 231 to the electronic device 240. Specifically, in some implementations, the control logic 211 generates a command for the interface device 220, which may notify the interface device 220 that the write pointer of the ring buffer 231 is changed, so as to trigger the interface device 220 to perform data transmission. The control logic 211 may trigger, by initiating actively a corresponding event for the interface device 220, the interface device 220 to detect and read the command. Alternatively, after the command is generated, it is possible to wait for a hardware polling of the interface device 220. Through hardware polling, the interface device 220 may detect the command.

In some implementations, in order to facilitate a fast data transmission of the interface device 220, the command generated by the control logic 211 of the electronic device 210 indicates the source memory address of the data portion to be transmitted in the ring buffer 231. In response to detection of the command, the interface device 220, for example, the control logic 223 of the interface device 220, directly reads, based on the source memory address indicated by the command, the data portion of the first data stream from the ring buffer 231 via the physical interface 221. In the streaming communication of the subject matter described herein, the data transmitted by the interface device 220 each time may be of any size. As aforementioned, such data size does not need to be concerned or specified by the application 215, but may be preconfigured to the interface device 220 or the electronic device 210. The data size of each transmission may also be changed as required. As such, more flexible data transmission can be achieved.

In some implementations, the interface device 220 may transmit the data portion to the electronic device 240. This data portion transmitted to the electronic device may be stored into the ring buffer 253. Relying on the connection between the interface device 220 and the electronic device 240, the interface device 220 may directly access the memory 243 to write the data portion into the ring buffer 253, or may send the data portion to another device (e.g., another interface device connected with the electronic device 240) such that the data portion can be written by the other device into the ring buffer 253. The example will be discussed below.

In some implementations, in order to avoid the memory overhead and processing latency of the interface device 220, the control logic 211 of the electronic device 210 determines, for the interface device 220, a destination memory address of the data portion in the ring buffer 253 to be transmitted, and such destination memory address is included in the command for the interface device 220. In such an implementation, the electronic device 210 also maintains status information related to the ring buffer 253 of the electronic device 240 at the opposite side, for example, in the storage area 235. Such status information at least includes a write pointer 256 and a read pointer 258 of the ring buffer 253. The control logic 211 of the electronic device 210 may determine, based on the writer pointer 256 and the read pointer 258, the destination memory address of the data portion in the ring buffer 253. The write pointer 256 maintained in the storage area 235 is updated as data is continuously written into the ring buffer 253, while the read pointer 258 is updated as data is read from the ring buffer 253. The pointer update manner of the ring buffer in the other device will be discussed below.

Upon detecting the command from the electronic device 210, the control logic 223 of the interface device 220 transmits, based on the destination memory address in the command, the corresponding data portion to the electronic device 240, such that the data portion can be stored at the storage position corresponding to the destination memory address in the ring buffer 253.

By maintaining, by the electronic device 210, the status information related to the data transmission in the other electronic device 240 and computing the destination memory address, it is unnecessary to store and maintain any status information in the memory 225 of the interface device 220. In other words, the interface device 220 may be in a stateless mode. In this way, it can prevent the interface device 220 from storing, using the limited on-chip memory space, the write pointer 256 and the read pointer 258 of the ring buffer 253 as well as status information, such as a storage conversation table and the like, and can also avoid the interface device 220 from using more computing resources for computing the destination memory address of the data portion to be transmitted. Moreover, since the increased data streams/connections and each data portion transmission do not incur too much memory and computing overhead, the scalability of the interface device 220 is enhanced, which can support more concurrent connections and faster data transmission.

In the streaming communication between the electronic device 210 and the electronic device 240 discussed above, description is provided with the electronic device 210 as the device of the sender and the electronic device 240 as the device of the receiver. During inter-device communication, data transmission is typically bi-directional, i.e., the electronic device 240 may also act as a data sender for sending data to the electronic device 210, the data receiver. In this case, the memory 213 of the electronic device 210 is also allocated therein a ring buffer 233 (which is sometimes referred to as the "third ring buffer," for the purpose of illustration) dedicated for storing data streams (which is sometimes referred to as the "second data stream," for the purpose of illustration) for the application 215 received from the electronic device 240. The ring buffer 233 is also referred to as received data buffer of the electronic device 210. Similar to other ring buffers, the ring buffer 233 also includes a write pointer 236 and a read pointer 238 pointing to a data-writable memory address and a data-readable memory address, respectively, in the buffer.

Correspondingly, the memory 243 of the electronic device 240 is allocated therein a ring buffer 251 (which is sometimes referred to as the "fourth ring buffer" herein, for the purpose of illustration) dedicated to storing the second data stream to be transmitted to the electronic device 210. The second data stream may be a data stream expected to be transmitted by the application 245 in the electronic device 240 to the application 215 in the electronic device 210. The ring buffer 251 may also be referred to as buffer of the electronic device 240 for data to be transmitted. Similar to other ring buffers, the ring buffer 251 also includes a write pointer 252 and a read pointer 254 pointing to a data-writable memory address and a data-readable memory address, respectively, in the ring buffer.

In the implementations where a connection is established between the application 215 and the application 245, both the ring buffer 233 and the ring buffer 251 are considered to be dedicated to this connection. Through the arrangement of ring buffers, from the angle of the application 245 in the electronic device 240, whenever any data is to be transmitted, the portion of the data can be written into the ring buffer 251 to achieve the streaming transmission effect. Therefore, bidirectional streaming transmission between the application 215 of the electronic device 210 and the application 245 of the electronic device 240 is achieved.

The process of sending a data portion stored in the ring buffer 251 from the electronic device 240 to the electronic device 210 is similar to the process of sending a data portion from the electronic device 210 to the electronic device 240, which is not repeated herein. Of course, depending on the manner of connection with the interface device 220, the electronic device 240 may write the data portion into the ring buffer 233 directly via the interface device 220 or implement data transmission and write via other interface devices (which will be described in detail below).

In some implementations, the write pointer 236 and the read pointer 238 in the ring buffer 233, as a local ring buffer, are located in the memory 213, for example, the storage area 235. The write pointer 236 is updated as the data is continuously written into the ring buffer 233, while the read pointer 238 is updated as the data is read from the ring buffer 233. In some implementations, the write pointer 252 and the read pointer 254 of the ring buffer 251 are also maintained in the storage area 213, specifically the storage area 235. The write pointer 252 is updated as the data is continuously written into the ring buffer 251, while the read pointer 254 is updated as the data is read from the ring buffer 251.

In some implementations, respective ring buffers in the memories 213 and 243 may be allocated when the connection for the application 215 is established between the electronic device 210 and the electronic device 240. The size of the respective ring buffers may be determined based on the bandwidth delay product (BDP) between the electronic device 210 and the electronic device 240, for example, greater than or equal to the BDP.

Inter-Device Communication Via Network

Figure 3:
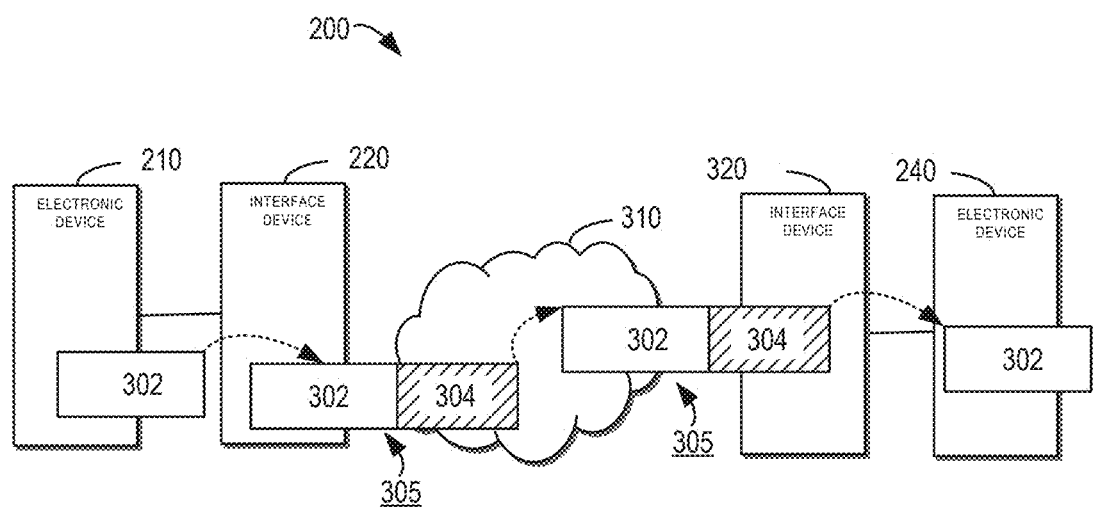
FIG. 3 is a system block diagram illustrating inter-device streaming communication via a network in accordance with some implementations of the subject matter described herein.

Referring to FIG. 2, how the streaming communication between the electronic device 210 and the electronic device 240 is realized is discussed above. In some implementations, the electronic device 210 needs to communicate with the electronic device 240 via a network, such network, for example, may be a wide area network (e.g., Internet), a local area network (e.g., Ethernet), or other inter-device networks. In this implementation, in addition to the electronic device 210, the electronic device 240 also needs an interface device, and the interface devices of two electronic devices implements communication coupling via a network. FIG. 3 illustrates an example implementation of a system 200 for inter-device streaming communication via a network. As shown in FIG. 3, the system 200 also includes an interface device 320 to which the electronic device 240 is connected. The interface device 220 and the interface device 320 are used for supporting the communication between the electronic device 210 and the electronic device 240 via the network 320.

In FIG. 3, for the purpose of illustration, the specific structures of the electronic device 210, the electronic device 240 and the interface device 220 are omitted herein. In some implementations, the interface device 320 may have a similar structure to that of the interface device 220, i.e., it may also include a physical interface, control logic and a memory. The physical interface of the interface device 220 may be used to provide a hardware connection with the electronic device 240, to connect directly or indirectly to the electronic device 210. In some implementations, according to the employed access technology, for example, DMA technology, the interface device 220 may directly access the memory of the electronic device 210. In addition, the physical interface 221 may also be used to support communication coupling between the electronic device 210 and the electronic device 240.

In some implementations, similar to the interface device 220, the interface device 320 also does not need to store status information related to inter-device communication (e.g., buffer pointers and status information related to the network). In other words, the interface device 320 may also be in a stateless mode. Likewise, the stateless mode of the interface device 320 may be implemented by storing and synchronizing the status information of both communication parties in the memory 243 of the electronic device 240. As will be appreciated from the following description, the interface device in the stateless mode can implement data reading, writing and receiving through only a simple operation. For the purpose of illustration, it is assumed that, in the communication between the electronic devices 210 and 240, the electronic device 210 and the interface device 220 are the data sender, while the electronic device 240 and the interface device 320 are the data receiver. The storage area 235 of the electronic device 210, as the data sender, stores necessary status information for both parties, for supporting a data transmission in the stateless mode.

Figure 4:
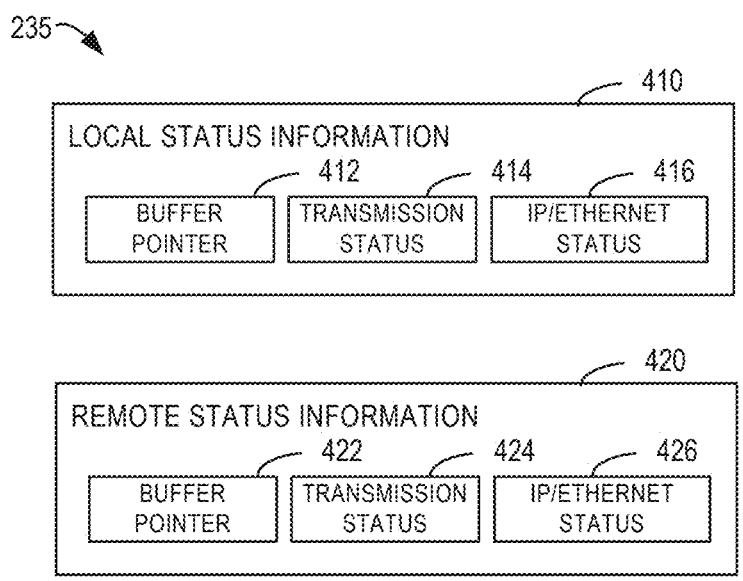
FIG. 4 illustrates an example of maintaining status information in a memory of an electronic device in accordance with some implementations of the subject matter described herein.

FIG. 4 illustrates the status information maintained in the storage area 235, including local status information 410 of a data sender side and remote status information 420 of a remote data receiver side. The local status information 410 and the remote status information 420 are associated with the connection established between two electronic devices (i.e., the connection for the application 215 and the application 245). For different connections, respective status information may be stored.

The local status information 410 includes buffer pointer information 412 which at least indicates the read pointer and write pointer of the respective ring buffers 231, 233 in the local memory 213. According to the network communication technology/protocol between the interface device 220 and the interface device 230, the local status information 410 may also include status information as required by the network data transmission executed at the interface device 220, for example, including transmission status information 414, IP/Ethernet status information 416, and the like, for indicating a packet sequence number, an IP/MAC address, and the like. The local status information 410 may further include any other context information related to inter-device communication. Similarly, the remote status information 420 includes ring buffer pointer information 422 which at least indicates the read pointer and the write pointer of the respective ring buffers 251, 253 in the remote memory 243. The remote status information 420 may further include status information as required by the network data transmission executed at the interface device 320, for example, transmission status information 424, IP/Ethernet status information 426, and the like, for indicating a packet sequence number, an IP/MAC address, and the like. The remote status information 420 may also include any other context information related to inter-device communication. The functionality and maintenance of the status information will be described in the following implementations. In the system of FIG. 3, similar status information may also be stored in the memory 243 of the electronic device 240, for supporting operations in a scenario where the electronic device 240 acts as a data sender.

When a communication is implemented through a network, the interface devices 220, 320 need to encapsulate the transmitted data into packets or in the format of message. Upon receiving the packets via the network, the interface device 220 or 320 performs respective processing, to store valid data portions into respective ring buffers. As a result, the streaming communication as provided in the subject matter described herein is efficiently adapted to support message/packet-based communication and Message Passing Interface (MPI) communication.

In FIG. 3, during a data transmission from the electronic device 210 to the electronic device 320, in accordance with the implementation as discussed above in connection with FIG. 2, the control logic 223 of the interface device 220 may read a data portion 302 from the ring buffer 231 of the electronic device 210. The control logic 223 then attaches a header 304 to the data portion 302, to encapsulate the data portion 302 and the header 304 into a packet 305. The packet 305 is used for data transmission. This packet 305 is transmitted to the interface device 320 via the physical interface 221 through a network 310. Upon receiving the packet, the interface device 320 de-encapsulates the packet 305, and writes the data portion 302 into the electronic device 240 based on the header 304 of the packet 305.

In some implementations, since the interface device 320 does not store the related status information locally, in order to achieve data transmission, the data sender may support normal data receiving of the interface device 320 through a header configuration of the packet sent to the interface device 320. Specifically, during an encapsulation of the packet 305, the header 304 of the data portion 302 attached to the interface device 320 at least indicates the destination memory address of the data portion 302 in the electronic device 240. Therefore, upon receiving the packet 305, the interface device 320 may determine the destination memory address of the data portion 302 from the header 304 and then write the data portion 302 into the destination memory address.

Figure 5:
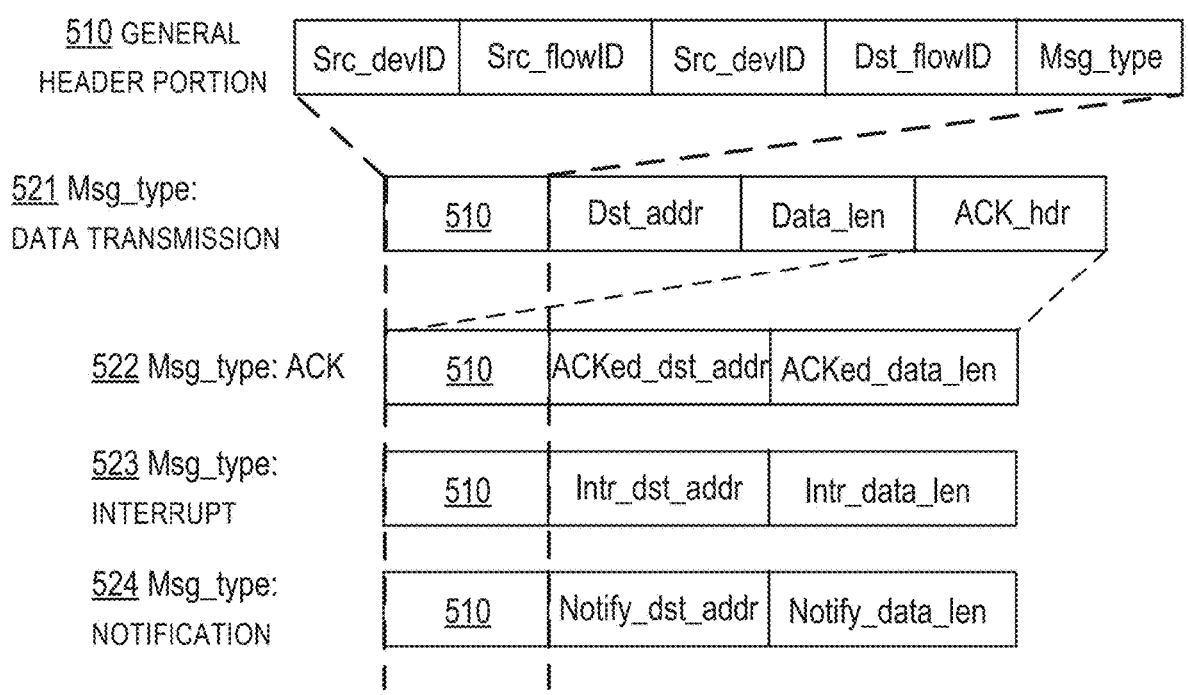
FIG. 5 illustrates an example of headers for packet encapsulation in streamlining communication in accordance with some implementations of the subject matter described herein.

In addition to the destination memory address, the header 304 may also include other information in data transmission. FIG. 5 illustrates an example in which a header is included in a packet for data transmission. FIG. 5 shows a general header portion 510 indicating a device identifier involved in a corresponding packet, an identifier of a corresponding data stream, and the type of the packet. Specifically, the general header portion 510 includes the first field (which is marked as "Src_devID") indicating the identifier of a source device of a packet, the second field (which is marked as "Src_flowID") indicating the source identifier of a corresponding data stream, the third field (which is marked as "Dst_devID") indicating the identifier of a destination device of the packet, the fourth field (which is marked as "Dst- _flowID") indicating the destination identifier of the corresponding data stream, and the fifth field (which is marked as "Msg_type") indicating the type of the packet. In some implementations, the type of packet includes a packet of data transmission, for transmitting payload data, and an example of the packet of this type is the packet 305. Apart from this, the type of packet further includes a packet for data transmission acknowledgement (ACK), a packet for application interrupt, and a packet for notification. These types of packets will be further mentioned below.

The header of a packet for data transmission (e.g., the packet 305) may include a header 521 in FIG. 5 with a general header portion 510. At this time, the fifth field of the general header portion 510 indicates that the type of the packet is used for data transmission. The header 521 also includes the first field (which is marked as "Dst_addr") indicating the destination memory address of a data portion to be transmitted, for example, the physical memory address of a ring buffer of a corresponding memory; the second field (which is marked as "Data_len") indicating the size of a data portion to be transmitted; and the third field (which is marked as "ACK_hdr") indicating the header of a packet for ACK in the subsequent transmission.

The header 304 for data transmission may include the header 521 shown in FIG. 5. The interface device 320 receiving the packet 305 may extract a destination memory address, from the field "Dst_addr," to write the respective data portion 302 directly into the corresponding storage position of the memory 243.

In some implementations, if the received data portion is successfully written into a finished data buffer (i.e., the ring buffer 253) in the memory 243, the interface device 320 may transmit a packet for data transmission ACK to the interface device 220. This packet indicates that the data portion received previously has been written successfully. In the stateless mode, the interface device 320 does not need to compute how to transmit the header of the packet because the header of the packet for data transmission already includes the header of the ACK packet (e.g., the field "ACK_hdr" of the header 521 in FIG. 5). FIG. 5 illustrates a header 522 of a packet for data transmission ACK (which is shortened as ACK packet). The header 522 also includes a general header portion 510, and in this case, the fifth field of the general header portion 510 indicates that the type of the packet is used for data transmission acknowledgement. The header 522 further includes the first field (which is marked as "ACKed_dst_addr") indicating the memory address of the data portion acknowledged as being written successfully, which actually corresponds to the second field ("Dst_addr") in the header 521 for data transmission. The header 522 also includes the second field (which is marked as "ACKed_data_len") indicating the length of data acknowledged as having been written successfully.

The header 522 may be fully included in the header 521 of the packet received by the interface device 320. That is to say, the electronic device 210 of the data sender computes header information of the subsequent ACK packet, and notifies the interface device 320. When the interface device 320 needs to transmit the ACK packet, the header information may be used directly, without extra computing. In some implementations, the header 522 may not be included in the header 521, i.e., the third field "ACK_hdr" in the header 521 may be omitted. When it is required to send the ACK packet, the control logic of the interface device 320 may also determine, through a simple processing, the header 522, based on the received related information in the header 521 for data transmission. Specifically, the control logic of the interface device 320 may use the second and third fields in the header 521 as the second and third fields of the header 522, respectively. In addition, the corresponding general header portion 510 in the header 522 may be obtained by exchanging information of the source device ID and the destination device ID field in the general header portion 510 of the packet for transmitting data, exchanging information of the source data stream ID and the destination data stream ID field, and modifying the field of the message type. In this process, the interface device 320 is not required to obtain extra status information.

In some implementations, upon receiving the ACK packet, the interface device 220 may control, on the basis, the remote status information 420 in the storage area 235 of the electronic device 210, in particular the buffer pointer information 422. The ACK packet indicates that the data transmitted previously is successfully written into the ring buffer 253, which means that the write pointer 256 of the ring buffer 253 will be modified by the electronic device 240, thus the control logic 211 of the electronic device 210 will modify the write pointer 256 indicated by the buffer pointer information 422 correspondingly, such that it points to a new data-writable memory address in the ring buffer 253. The new memory address may be determined based on the memory address currently pointed to by the write pointer 256, the length of the data acknowledged as being written successfully, other possible storage rules of the memory 243, and the like.

In some implementations, since the interface device 320 in the stateless mode does not know when to have the application 245 in the electronic device 240 executing the interrupt operation to extract the data in the ring buffer 253 and from which storage position data to start the extraction, the control logic 223 of the interface device 220 may also control to send a packet for application interrupt to the interface device 320. This packet is used to indicate the interface device 320 to send an interrupt request to the application 245 of the electronic device 240. In response to the interrupt request, the application 245 may read the received data from the ring buffer 253.

In some implementations, the packet for application interrupt may be initiated in response to the interface device 220 receiving an ACK packet or detecting an update of the write pointer 256 of the ring buffer 253. Receiving of the ACK packet or updating of the write pointer 256 indicates that there is data in the ring buffer 253 that can be obtained by the application. In some implementations, the interface device 220 may send the packet for application interrupt to the interface device 330 after receiving several ACK packets or determining in other manners that there is readable data in the ring buffer 253. In some other implementations, the interface device 220 may determine when the packet for application interrupt is sent, according to other criteria.

Note that, although an extra message exchange is required in the application interrupt mode to achieve the application interrupt, incurring extra round-trip time (RTT), the RTT is small enough to be neglected, as compared to the circumstance where the interface device 320 per se controls and computes initiation of the interrupt request.

FIG. 5 also shows a header 523 in the packet for application interrupt. The header 523 also includes a general header portion 510, and in this case, the fifth field of the general header portion 510 indicates that the type of the packet is directed to application interrupt. The header 523 further includes the first field (which is marked as "Inr_dst_addr") indicating the interrupt address of the ring buffer 253 used by the application 245. The interrupt address indicates that the application 245 should start to extract data from here. This interrupt address may be stored and maintained in the storage area 235. The header 523 further includes the second field (which is marked as "Intr_data_len") indicating the length of data to be extracted by the application 245. It should be appreciated that this field is optional, and the application 245 may extract data according to a receiving need.

In some implementations, as an alternative, transmission of the packet for application interrupt may bypass the interface device 220, and the interface device 320 may determine, through hardware polling for the electronic device 240, when and how an interrupt request for the application is transmitted.

In some implementations, if the application 245 on the electronic device 240 has already read a portion of data from the ring buffer 253, this enables the read pointer 258 of the ring buffer 253 to be updated. In this case, the interface device 320 (e.g., the control logic therein) may control to send a packet for notification to the interface device 220, to notify that the read pointer 258 of the ring buffer 253 is updated. FIG. 5 also shows a header 524 of the packet for notification. The header 524 also includes a general header portion 510, and in this case, the fifth field of the general header portion indicates that the type of the packet is for notification. The header 524 also includes the first field (which is marked as "Intr_dst_addr") indicating the memory address pointed to by the updated read pointer 258. The header 524 further includes the second field (which is marked as "Notify_data_len") indicating the data length read by the application 245 from the ring buffer 253. By synchronizing the read pointer of the ring buffer 253, it can be avoided that the data controlled by the electronic device 210 is sent back subsequently, thereby overwriting the data not read in the ring buffer 253.

It should be appreciated that, although respective fields of the header in a packet has been discussed with reference to FIG. 5, not every field in these fields is necessary or exclusive. In different implementations, one or more fields therein may be omitted, or one or more other fields may be added, as required. The implementations of the subject matter described herein are not limited in the aspect. Moreover, the lengths of the respective fields shown in FIG. 5 may be set in a unit of a byte, and may be of several bytes, dozens of bytes, or the like. In some implementations, in addition to the header 521, 522, 523 or 524 shown in FIG. 5, the packet 305 may further include other headers, for example, a header related to a network transmission protocol, such as an IP/Ethernet header or a transmission header. In some implementations, the header 521, 522, 523 or 524 may be located behind the header related to the network transmission protocol. In some implementations, the header 521, 522, 523 or 524 may be used to replace a conventional transmission header in a packet transmitted between interface devices.

In some implementations, since data read and write and application interrupt of the interface device 320 rely on packets received via a network, this may result in a potential security problem. In some implementations, the interface device 320 may store thereon a small amount of status information, for example, the write pointer 256 and the read pointer 258 of the ring buffer 253, the interrupt address of the application 245, and the write pointer 252 and the read pointer 254 of the ring buffer 251. Upon receiving a packet from the interface device 220, the interface device 320 may verify the security of the packet using the stored status information, and perform a subsequent operation corresponding to the packet received when determining that it is safe. In an implementation, the interface device 320 receives a packet for data transmission, and may determine, based on at least one of the write pointer 256, the read pointer 258 and the interrupt address stored in the memory of the storage device, the security of the destination memory address indicated in the packet, for example, whether the destination memory address of the write is writable, whether the data not read will be overwritten, and the like. Only when determining that the data is safe, it is allowed to store the data portion carried in the packet into the ring buffer 253.

It has been discussed in the above implementation how to perform data transmission when the interface device 220 and the electronic device 210 are the sender while the interface device 320 and the electronic device 240 are the receiver. In the other direction of the streaming communication between the two electronic devices, it may be that the interface 320 and the electronic device 240 are the sender while the interface device 220 and the electronic device 210 are the sender. In the opposite direction, transmission may be executed similarly to the counterpart in the above implementation in connection with the sender and the receiver. Hence, the communication in the opposite direction is omitted herein.

In some implementations in which security is taken into account, the interface device 310 may store thereon little status information, for example, the write pointer 236 and the read pointer 238 of the ring buffer 231, the interrupt address of the application 215, and the write pointer 232 and the read pointer 234 of the ring buffer 231. Regarding the received packet, the security of the packet, in particular the security of the packet for data transmission, is verified based on the stored status information. The specific verifying manner is similar to the one discussed above, which is omitted herein.

Example Processes

Figure 6:
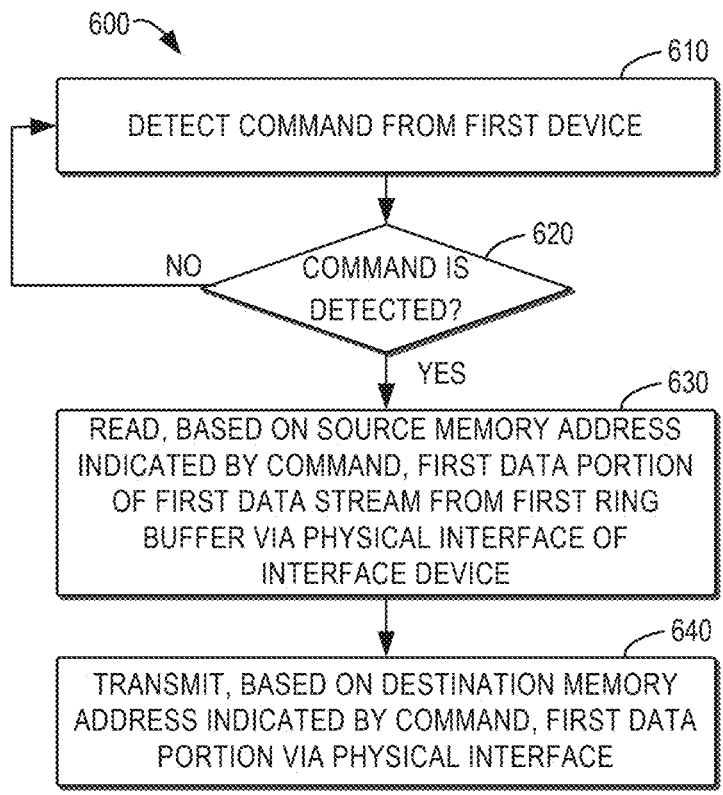
FIG. 6 is a flowchart illustrating a process implemented at an interface device in accordance with some implementations of the subject matter described herein.

FIG. 6 is a flowchart of a process 600 of inter-device streaming communication in accordance with some implementations of the subject matter described herein. The process 600 may be implemented by interface devices in accordance with implementations of the subject matter described herein, for example, the interface devices 220, 320 as shown in FIGS. 2 and 3.

At block 610, a command from a first device is detected. The first device includes a first memory including a first ring buffer allocated to be dedicated for storing the first data stream of an application to be transmitted to the second device. At block 620, it is determined whether the command is detected. If not detected, the command detection is performed continuously. If the command is detected, at block 630, the first data portion of the first data stream is read based on the source memory address indicated by the command from the first ring buffer via a physical interface of an interface device. At block 640, based on the destination memory address indicated by the command, the first data portion is transmitted to the second device via the physical interface.

In some implementations, the second electronic device includes the second ring buffer allocated to be dedicated for storing the first data stream received from the electronic device, and the first memory stores the write pointer of the second ring buffer to a data-writable memory address in the second ring buffer. In some implementations, the process 600 also includes, in response to the second packet, causing the first device to update the write pointer of the second ring buffer to point to a new data-writable memory address in the second ring buffer.

In some implementations, the process 600 also includes transmitting the third packet including the third header to the further interface device via the network, the third packet indicating that the further interface device transmits an interrupt request to an application of the second device, the third header at least indicating an interrupt address of the second ring buffer to be used by the application of the second device.

In some implementations, the first memory stores the read pointer of the second ring buffer to a data-readable memory address in the second ring buffer. In some implementations, the process 600 further includes receiving, from the further interface device and via the network, the fourth packet including the fourth header and notifying an update of the read pointer of the second ring buffer, the update being triggered by reading data from the second ring buffer by an application of the second device, and the fourth header indicating a memory address pointed to by the updated read pointer.

In some implementations, the first ring buffer is allocated during an establishment of the connection between the first device and the second device.

In some implementations, a physical interface is coupled to the further interface device including a physical interface connected with the second device via the network, so as to establish a connection between the first device and the second device. In some implementations, transmitting the first data portion to the second device includes: encapsulating the first data portion and the first header into the first packet for data transmission, the first header at least indicating the destination memory address; and transmitting the first packet to the further interface device via the network.

In some implementations, the process 600 further comprises receiving, from the further interface device and via the network, the second packet to confirm that the first data portion is stored, the second packet including the second header, and the second header at least indicating that the first data portion is confirmed to be stored to the destination memory address.

In some implementations, the second header is extracted from the first header by the further interface device to be included in the second packet.

In some implementations, the process 600 further includes receiving, from the further network device via the network, the fifth packet for data transmission, the fifth packet including the fifth header and the second data portion for the application, the fifth header at least indicating a destination memory address of the second data portion in the third ring buffer of the first memory, the third ring buffer being allocated to be dedicated for storing the second data stream for the application received from the second device; and storing the second data portion to the third ring buffer based on the destination memory address for the second data portion.

In some implementations, the first memory stores a write pointer and a read pointer of the third ring buffer to a data-writable memory address and a data-readable memory address, respectively, in the third ring buffer, and the first memory further stores an interrupt address of the application in the third ring buffer. The process 600 further includes determining security of the destination memory address of the second data portion based on at least one of the write pointer, the read pointer, and the interrupt address of the third ring buffer stored in the first memory, and in response to confirming of the security, storing the second data portion to the third ring buffer.

In some implementations, the interface device includes a network interface card (NIC).

Figure 7:
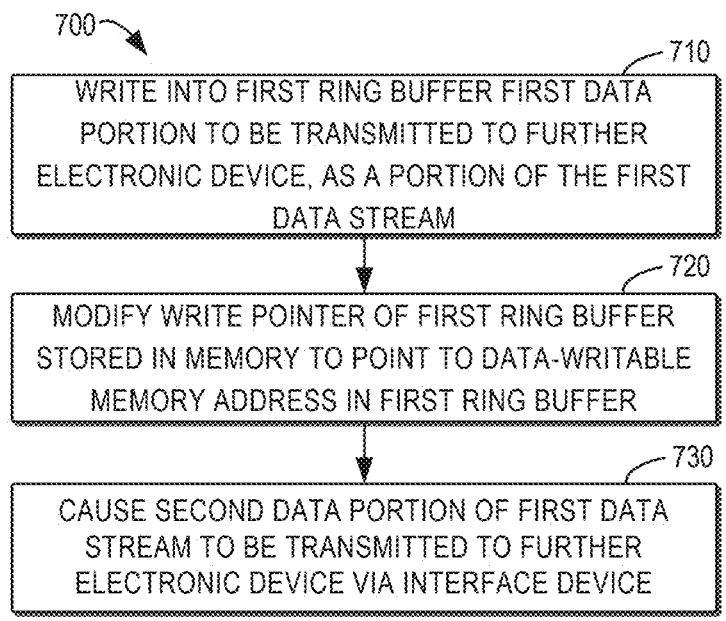
FIG. 7 is a flowchart illustrating a process implemented at an electronic device in accordance with some implementations of the subject matter described herein.

FIG. 7 is a flowchart illustrating a process 700 of inter-device streaming communication in accordance with some implementations of the subject matter described herein. The process 700 may be performed by the electronic devices implemented in accordance with the implementations of the subject matter described herein, for example, the electronic devices 210, 240 shown in FIGS. 2 and 3.

At block 710, in response to a write request of an application, the first data portion to be transmitted to a further electronic device is written into the first ring buffer of the memory of the electronic device, as a portion of the first data stream. At block 720, a write pointer of the first ring buffer stored in the memory is modified to point to a data-writable memory address in the first ring buffer. At block 730, in response to the write pointer of the first ring buffer being modified, the second data portion in the first data stream is caused to be transmitted to the further electronic device via a connected interface device.

In some implementations, causing the second data portion to be transmitted to the further electronic device via the interface device comprises: determining, based at least on a read pointer of the first ring buffer stored in the memory, a source memory address of the second data portion in the first ring buffer, the read pointer of the first ring buffer pointing to a data-readable memory address in the first ring buffer; generating a command for the interface device, the command at least indicating the source memory address; and causing the command to be notified to the interface device, to enable the interface device to read the second data portion from the first ring buffer based on the source memory address.

In some implementations, the further electronic device includes the second ring buffer allocated to be dedicated for storing the first data stream received from the electronic device, and the memory further stores a write pointer and a read pointer of the second ring buffer pointing to a data-writable memory address and a data-readable memory address in the second ring buffer, respectively. In some implementations, causing the second data portion to be transmitted via the interface device to the further electronic device further includes: determining a destination memory address of the second data portion in the second ring buffer based on the write pointer and the read pointer of the second buffer, and generating a command to further indicate the destination memory address, to enable the interface device to transmit the second data portion to the second ring buffer based on the destination memory address.

In some implementations, the memory further includes the third ring buffer allocated to be dedicated for storing a second data stream for the application received from the further electronic device. In some implementations, the process 700 further includes, in response to the third data portion of the second data stream being directly written into the third ring buffer, modifying a write pointer of the third ring buffer stored in the memory to point to a data-writable memory address in the third ring buffer.

In some implementations, the memory further stores a read pointer of the third ring buffer pointing to a data-readable memory address in the third ring buffer.

In some implementations, the further electronic device includes the fourth ring buffer allocated to be dedicated for storing the second data stream to be transmitted to the electronic device, and wherein the memory further stores a write pointer and a read pointer of the fourth ring buffer to a data-writable memory address and a data-readable memory address, respectively, in the fourth ring buffer.

Example Implementations

Some example implementations of the subject matter described herein will be given below.

In a first aspect, there is provided an electronic device. The electronic device comprises: a memory comprising a first ring buffer allocated to be dedicated for storing a first data stream of an application to be transmitted to a further electronic device; and control logic configured to: in response to a write request of the application, write, into the first ring buffer, a first data portion to be transmitted to the further electronic device, as a portion of the first data stream, modify a write pointer of the first ring buffer stored in the memory to point to a data-writable memory address in the first ring buffer, and in response to the write pointer of the first ring buffer being modified, cause a second data portion of the first data stream to be transmitted to the further electronic device via a connected interface device.

In some implementations, the control logic is configured to: determine, based at least on a read pointer of the first ring buffer stored in the memory, a source memory address of the second data portion in the first ring buffer, the read pointer of the first ring buffer pointing to a data-readable memory address in the first ring buffer; generate a command for the interface device, the command at least indicating the source memory address; and cause the command to be notified to the interface device, to enable the interface device to read the second data portion from the first ring buffer based on the source memory address.

In some implementations, the further electronic device comprises a second ring buffer allocated to be dedicated for storing the first data stream received from the electronic device, the memory further storing a write pointer and a read pointer of the second ring buffer pointing to a data-writable memory address and a data-readable memory address in the second ring buffer, respectively. In some implementations, the control logic is further configured to: determine a destination memory address of the second data portion in the second ring buffer based on the write pointer and the read pointer of the second ring buffer, and generate the command to further indicate the destination memory address, to enable the interface device to transmit the second data portion to the second ring buffer based on the destination memory address.

In some implementations, the memory further comprises a third ring buffer allocated to be dedicated for storing a second data stream for the application received from the further electronic device. In some implementations, the control logic is configured to: in response to a third data portion of the second data stream being directly written by the interface device into the third ring buffer, modify a write pointer of the third ring buffer stored in the memory to point to a data-writable memory address in the third ring buffer.

In some implementations, the memory further stores a read pointer of the third ring buffer pointing to a data-readable memory address in the third ring buffer.

In some implementations, the further electronic device comprises a fourth ring buffer allocated to be dedicated for storing the second data stream to be transmitted to the electronic device, and wherein the memory further stores a write pointer and a read pointer of the fourth ring buffer pointing to a data-writable memory address and a data-readable memory address, respectively, in the fourth ring buffer.

In a second aspect, there is provided an interface device. The interface device comprises: a physical interface connected to a first device comprising a first memory, the first memory comprising a first ring buffer allocated to be dedicated for storing a first data stream of an application to be transmitted to a second device; and control logic configured to: in response to detection of a command from the first device, read, based on a source memory address indicated by the command, a first data portion of the first data stream from the first ring buffer via the physical interface, and transmit, based on a destination memory address indicated by the command, the first data portion to the second device via the physical interface.

In some implementations, the physical interface is coupled to a further interface device comprising a physical interface connected with the second device via a network, so as to establish a connection between the first device and the second device. In some implementations, the control logic is configured to: encapsulate the first data portion and a first header into a first packet for data transmission, the first header at least indicating the destination memory address; and transmit the first packet to the further interface device via the network.

In some implementations, the control logic is further configured to: receive, from the further interface device and via the network, a second packet to confirm that the first data portion is stored, the second packet comprising a second header, and the second header at least indicating that the first data portion is confirmed to be stored to the destination memory address.

In some implementations, the second header is extracted from the first header by the further interface device to be comprised in the second packet.

In some implementations, the second electronic device comprises a second ring buffer allocated to be dedicated for storing the first data stream received from the electronic device, the first memory storing a write pointer of the second ring buffer pointing to a data-writable memory address in the second ring buffer. In some implementations, the control logic is further configured to cause, in response to the second packet, the first device to update the write pointer of the second ring buffer to point to a new data-writable memory address in the second ring buffer.

In some implementations, the control logic is further configured to: transmit a third packet comprising a third header to the further interface device via the network, the third packet indicating that the further interface device transmits an interrupt request to an application of the second device, the third header at least indicating an interrupt address of the second ring buffer to be used by the application of the second device.

In some implementations, the first memory stores a read pointer of the second ring buffer to a data-readable memory address in the second ring buffer. In some implementations, the control logic is further configured to: receive, from the further interface device and via the network, a fourth packet comprising a fourth header and notifying an update of the read pointer of the second ring buffer, the update being triggered by reading data from the second ring buffer by an application of the second device, and the fourth header indicating a memory address pointed to by the updated read pointer.

In some implementations, the first ring buffer is allocated during an establishment of the connection between the first device and the second device.

In some implementations, the control logic is further configured to: receive, from the further interface device via the network, a fifth packet for data transmission, the fifth packet comprising a fifth header and a second data portion for the application, the fifth header at least indicating a destination memory address of the second data portion in a third ring buffer of the first memory, the third ring buffer being allocated to be dedicated for storing a second data stream for the application received from the second device; and store the second data portion to the third ring buffer based on the destination memory address for the second data portion.

In some implementations, the first memory stores a write pointer and a read pointer of the third ring buffer to a data-writable memory address and a data-readable memory address, respectively, in the third ring buffer, and the first memory further stores an interrupt address of the application in the third ring buffer. In some implementations, the control logic is further configured to: determine security of the destination memory address of the second data portion based on at least one of the write pointer, the read pointer, and the interrupt address of the third ring buffer stored in the first memory, and in response to confirmation of the security, storing the second data portion to the third ring buffer.

In some implementations, the interface device comprises a network interface card (NIC).

In a third aspect, there is provided a method for inter-device communication. The method comprises: detecting a command from a first device with a first memory, the first memory comprising a first ring buffer allocated to be dedicated for storing a first data stream of an application to be transmitted to a second device; in response to detection of the command, reading, based on a source memory address indicated by the command, a first data portion of the first data stream from the first ring buffer via a physical interface of the interface device; and transmitting, based on a destination memory address indicated by the command, the first data portion to the second device via the physical interface.

In some implementations, the interface device is coupled to, via a network, a further interface device connected with the second device, so as to establish a connection between the first device and the second device. In some implementations, transmitting the first data portion to the second device comprises: encapsulating the first data portion and a first header into a first packet for data transmission, the first header at least indicating the destination memory address; and transmitting the first packet to the further interface device via the network.

In some implementations, the method further comprises receiving, from the further interface device and via the network, a second packet to confirm that the first data portion is stored, the second packet comprising a second header, and the second header at least indicating that the first data portion is confirmed to be stored to the destination memory address.

In some implementations, the second header is extracted from the first header by the further interface device to be comprised in the second packet.

In some implementations, the second electronic device comprises a second ring buffer allocated to be dedicated for storing the first data stream received from the electronic device, the first memory storing a write pointer of the second ring buffer pointing to a data-writable memory address in the second ring buffer. In some implementations, the control logic is further configured to cause, in response to the second packet, the first device to update the write pointer of the second ring buffer to point to a new data-writable memory address in the second ring buffer.

In some implementations, the method further comprises transmitting a third packet comprising a third header to the further interface device via the network, the third packet indicating that the further interface device transmits an interrupt request to an application of the second device, the third header at least indicating an interrupt address of the second ring buffer to be used by the application of the second device.

In some implementations, the first memory stores a read pointer of a second ring buffer to a data-readable memory address in the second ring buffer. In some implementations, the method further comprises receiving, from the further interface device and via the network, a fourth packet comprising a fourth header and notifying an update of the read pointer of the second ring buffer, the update being triggered by reading data from the second ring buffer by an application of the second device, and the fourth header indicating a memory address pointed to by the updated read pointer.

In some implementations, the first ring buffer is allocated during an establishment of the connection between the first device and the second device.

In some implementations, the method further comprises receiving, from the further interface device via the network, a fifth packet for data transmission, the fifth packet comprising a fifth header and a second data portion for the application, the fifth header at least indicating a destination memory address of the second data portion in a third ring buffer of the first memory, the third ring buffer being allocated to be dedicated for storing a second data stream for the application received from the second device; and storing the second data portion to the third ring buffer based on the destination memory address for the second data portion.

In some implementations, the first memory stores a write pointer and a read pointer of the third ring buffer to a data-writable memory address and a data-readable memory address, respectively, in the third ring buffer, and the first memory further stores an interrupt address of the application in the third ring buffer. The method further comprises: determining security of the destination memory address of the second data portion based on at least one of the write pointer, the read pointer, and the interrupt address of the third ring buffer stored in the first memory, and in response to confirmation of the security, storing the second data portion to the third ring buffer.

In some implementations, the interface device comprises a network interface card (NIC).

In a fourth aspect, there is provided a method of inter-device communication. The method comprises: in response to a write request of the application, writing, into the first ring buffer a first data portion to be transmitted to the further electronic device, as a portion of the first data stream; modifying a write pointer of the first ring buffer stored in the memory to point to a data-writable memory address in the first ring buffer; and in response to the write pointer of the first ring buffer being modified, causing a second data portion of the first data stream to be transmitted to the further electronic device via a connected interface device.

In some implementations, transmitting a second data portion to the further electronic device via the interface device comprises: determining, based at least on a read pointer of the first ring buffer stored in the memory, a source memory address of the second data portion in the first ring buffer, the read pointer of the first ring buffer pointing to a data-readable memory address in the first ring buffer; generating a command for the interface device, the command at least indicating the source memory address; and causing the command to be notified to the interface device, to enable the interface device to read the second data portion from the first ring buffer based on the source memory address.

In some implementations, the further electronic device comprises a second ring buffer allocated to be dedicated for storing the first data stream received from the electronic device, the memory further storing a write pointer and a read pointer of the second ring buffer pointing to a data-writable memory address and a data-readable memory address in the second ring buffer, respectively. In some implementations, transmitting a second data portion to the further electronic device via the interface device further comprises: determining a destination memory address of the second data portion in the second ring buffer based on the write pointer and the read pointer of the second ring buffer, and generating the command to further indicate the destination memory address, to enable the interface device to transmit the second data portion to the second ring buffer based on the destination memory address.

In some implementations, the memory further comprises a third ring buffer allocated to be dedicated for storing a second data stream for the application received from the further electronic device. In some implementations, the method comprises: in response to a third data portion of the second data stream being directly written by the interface device into the third ring buffer, modifying a write pointer of the third ring buffer stored in the memory to point to a data-writable memory address in the third ring buffer.

In some implementations, the memory further stores a read pointer of the third ring buffer pointing to a data-readable memory address in the third ring buffer.

In some implementations, the further electronic device comprises a fourth ring buffer allocated to be dedicated for storing the second data stream to be transmitted to the electronic device, and wherein the memory further stores a write pointer and a read pointer of the fourth ring buffer pointing to a data-writable memory address and a data-readable memory address, respectively, in the fourth ring buffer.

In a fifth aspect, the subject matter described herein provides a computer program product, which is tangibly stored in a computer storage medium and includes machine-executable instructions which, when executed by a device, cause the device to perform the method in accordance with the third or fourth aspect.

In a sixth aspect, the subject matter described herein provides a computer-readable medium which stores thereon machine-executable instructions which, when executed by a device, cause the device to perform the method in accordance with the third or fourth aspect.

The functionally described herein can be performed, at least in part, by one or more hardware logic components. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), and the like.

Program code for carrying out methods of the subject matter described herein may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of this disclosure, a machine-readable medium may be any tangible medium that may contain, or store a program for use by or in connection with an instruction execution system, apparatus, or device. The machine-readable medium may be a machine-readable signal medium or a machine-readable storage medium. A machine-readable medium may include, but is not limited to, an electronic, magnetic, optical, electromagnetic, infrared, or semiconductor system, an apparatus, or a device, or any suitable combination of the foregoing. More specific examples of the machine-readable storage medium may include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the subject matter described herein, but rather as descriptions of features that may be specific to particular implementations. Certain features that are described in the context of separate implementations may also be implemented in combination in a single implementation. Rather, various features described in the context of a single implementation may also be implemented in multiple implementations separately or in any suitable sub-combination.

Although the subject matter has been described in language specific to structural features and/or methodological acts, it is to be understood that the subject matter specified in the appended claims is not necessarily limited to the specific features or acts described above. Rather, the specific features and acts described above are disclosed as example forms of implementing the claims.

The invention claimed is:

1. An interface device comprising:
a physical interface connected to a first device comprising a first memory, the first memory comprising a first ring buffer allocated to be dedicated for storing a first data stream of an application to be transmitted to a second device; and
control logic configured to:
in response to detection of a command from the first device, read, based on a source memory address indicated by the command, a first data portion of the first data stream from the first ring buffer via the physical interface;
transmit, based on a destination memory address indicated by the command, the first data portion to the second device via the physical interface; and
receive, via a network, a second packet to confirm that the first data portion is stored, the second packet comprising a second header, and the second header at least indicating that the first data portion is confirmed to be stored to the destination memory address, wherein the second packet is received from a further interface device coupled to the physical interface, the further interface device comprising a second physical interface connected with the second device, wherein the network is used to establish a connection between the first device and the second device.

2. The interface device of claim 1, wherein the control logic is configured to:
encapsulate the first data portion and a first header into a first packet for data transmission, the first header at least indicating the destination memory address; and
transmit the first packet to the further interface device via the network.

3. The interface device of claim 2, wherein the second header is extracted from the first header by the further interface device to be comprised in the second packet.

4. The interface device of claim 2, wherein the second device comprises a second ring buffer allocated to be dedicated for storing the first data stream received from the first device, the first memory storing a write pointer of the second ring buffer to a data-writable memory address in the second ring buffer; and
wherein the control logic is further configured to cause, in response to the second packet, the first device to update the write pointer of the second ring buffer to point to a new data-writable memory address in the second ring buffer.

5. The interface device of claim 4, wherein the control logic is further configured to:
transmit a third packet comprising a third header to the further interface device via the network, the third packet indicating that the further interface device transmits an interrupt request to an application of the second device, the third header at least indicating an interrupt address of the second ring buffer to be used by the application of the second device.

6. The interface device of claim 4, wherein the first memory stores a read pointer of the second ring buffer to a data-readable memory address in the second ring buffer; and
wherein the control logic is further configured to:
receive, from the further interface device and via the network, a fourth packet comprising a fourth header and notifying an update of the read pointer of the second ring buffer, the update being triggered by reading data from the second ring buffer by an application of the second device, and the fourth header indicating a memory address pointed to by the updated read pointer.

7. A method implemented at an interface device, comprising:
detecting a command from a first device with a first memory, the first memory comprising a first ring buffer allocated to be dedicated for storing a first data stream of an application to be transmitted to a second device;
in response to detection of the command, reading, based on a source memory address indicated by the command, a first data portion of the first data stream from the first ring buffer via a physical interface of the interface device;
transmitting, based on a destination memory address indicated by the command, the first data portion to the second device via the physical interface; and receiving, via a network, a second packet to confirm that the first data portion is stored, the second packet comprising a second header, and the second header at least indicating that the first data portion is confirmed to be stored to the destination memory address, wherein the second packet is received from a further interface device coupled to the physical interface, the further interface device comprising a second physical interface connected with the second device, wherein the network used to establish a connection between the first device and the second device.

8. The method of claim 7, wherein transmitting the first data portion to the second device comprises:
encapsulating the first data portion and a first header into a first packet for data transmission, the first header at least indicating the destination memory address; and
transmitting the first packet to the further interface device via the network.

9. The method of claim 8, wherein the second header is extracted from the first header by the further interface device to be comprised in the second packet.

10. The method of claim 7, wherein the second device comprises a second ring buffer allocated to be dedicated for storing the first data stream received from the first device, the first memory storing a write pointer of the second ring buffer to a data-writable memory address in the second ring buffer and the method further comprising:
in response to the second packet, updating, by the first device, the write pointer of the second ring buffer to point to a new data-writable memory address in the second ring buffer.

11. The method of claim 10, further comprising:
transmitting a third packet comprising a third header to the further interface device via the network, the third packet indicating that the further interface device transmits an interrupt request to an application of the second device, the third header at least indicating an interrupt address of the second ring buffer to be used by the application of the second device.

12. The method of claim 10, wherein the first memory stores a read pointer of the second ring buffer to a data-readable memory address in the second ring buffer and the method further comprising:
receiving, from the further interface device and via the network, a fourth packet comprising a fourth header and notifying an update of the read pointer of the second ring buffer, the update being triggered by reading data from the second ring buffer by an application of the second device, and the fourth header indicating a memory address pointed to by the updated read pointer.

13. The method of claim 7, wherein a third ring buffer is allocated to be dedicated for storing a second data stream for the application received from the further interface device and the method further comprising:
in response to a third data portion of the second data stream being directly written by the interface device into the third ring buffer, modifying a write pointer of the third ring buffer stored in the first memory to point to a data-writable memory address in the third ring buffer.

14. At least one non-transitory machine-readable medium comprising instructions that, when executed by at least one processor, cause the at least one processor to perform operations to:
detect a command from a first device with a first memory, the first memory comprising a first ring buffer allocated to be dedicated for storing a first data stream of an application to be transmitted to a second device;

in response to detection of the command, read, based on a source memory address indicated by the command, a first data portion of the first data stream from the first ring buffer via a physical interface of an interface device;

transmit, based on a destination memory address indicated by the command, the first data portion to the second device via the physical interface; and receive, via a network, a second packet to confirm that the first data portion is stored, the second packet comprising a second header, and the second header at least indicating that the first data portion is confirmed to be stored to the destination memory address, wherein the second packet is received from a further interface device coupled to the physical interface, the further interface device comprising a second physical interface connected with the second device, wherein the network used to establish a connection between the first device and the second device.

15. The at least one non-transitory machine-readable medium of claim 14, wherein the instructions to transmit the first data portion to the second device comprises instructions to:

encapsulate the first data portion and a first header into a first packet for data transmission, the first header at least indicating the destination memory address; and transmit the first packet to the further interface device via the network.

16. The at least one non-transitory machine-readable medium of claim 15, wherein the second header is extracted from the first header by the further interface device to be comprised in the second packet.

17. The at least one non-transitory machine-readable medium of claim 14, wherein the second device comprises a second ring buffer allocated to be dedicated for storing the first data stream received from the first device, the first memory storing a write pointer of the second ring buffer to a data-writable memory address in the second ring buffer and the instructions further comprising instructions to:

in response to the second packet, update, by the first device, the write pointer of the second ring buffer to point to a new data-writable memory address in the second ring buffer.

18. The at least one non-transitory machine-readable medium of claim 17, further comprising instructions to:

transmit a third packet comprising a third header to the further interface device via the network, the third packet indicating that the further interface device transmits an interrupt request to an application of the second device, the third header at least indicating an interrupt address of the second ring buffer to be used by the application of the second device.

19. The at least one non-transitory machine-readable medium of claim 17, wherein the first memory stores a read pointer of the second ring buffer to a data-readable memory address in the second ring buffer and the at least one non-transitory machine-readable medium further comprising instructions to:

receive, from the further interface device and via the network, a fourth packet comprising a fourth header and notifying an update of the read pointer of the second ring buffer, the update being triggered by reading data from the second ring buffer by an application of the second device, and the fourth header indicating a memory address pointed to by the updated read pointer.

20. The at least one non-transitory machine-readable medium of claim 14, wherein a third ring buffer is allocated to be dedicated for storing a second data stream for the application received from the further interface device and further comprising instructions to:

in response to a third data portion of the second data stream being directly written by the interface device into the third ring buffer, modify a write pointer of the third ring buffer stored in memory to point to a data-writable memory address in the third ring buffer.

* * * * *